(12) United States Patent
Zimmerer et al.

(10) Patent No.: US 9,185,748 B2
(45) Date of Patent: Nov. 10, 2015

(54) ELECTRICAL PANEL HEATING DEVICE AND METHOD AND BUILDING MATERIALS FOR THE PROTECTION THEREOF

(76) Inventors: Wilhelm Zimmerer, Strassen (LU); Laura Zimmerer, Strassen (LU)

( * ) Notice: Subject to any disclaimer, the term of this patent is extended or adjusted under 35 U.S.C. 154(b) by 610 days.

(21) Appl. No.: 13/138,998

(22) PCT Filed: May 4, 2010

(86) PCT No.: PCT/EP2010/002714
§ 371 (c)(1),
(2), (4) Date: Jan. 30, 2012

(87) PCT Pub. No.: WO2010/130353
PCT Pub. Date: Nov. 18, 2010

(65) Prior Publication Data
US 2012/0175359 A1    Jul. 12, 2012

(30) Foreign Application Priority Data

May 11, 2009  (DE) .......................... 10 2009 020 669

(51) Int. Cl.
| | |
|---|---|
| H05B 1/00 | (2006.01) |
| H05B 3/24 | (2006.01) |
| F24D 13/02 | (2006.01) |
| H05B 3/14 | (2006.01) |

(52) U.S. Cl.
CPC ............... *H05B 3/24* (2013.01); *F24D 13/022* (2013.01); *H05B 3/141* (2013.01); *H05B 2203/011* (2013.01); *H05B 2203/017* (2013.01); *H05B 2203/026* (2013.01); *Y02B 30/26* (2013.01); *Y10T 29/49083* (2015.01)

(58) Field of Classification Search
CPC ....... F24D 13/022; F24D 13/24; H05B 3/141; H05B 3/145; H05B 3/24; H05B 2203/026; H05B 2203/011; H05B 2203/017
See application file for complete search history.

(56) References Cited

U.S. PATENT DOCUMENTS

| | | | |
|---|---|---|---|
| 4,608,795 A * | 9/1986 | Neuschaeffer et al. | .... 52/309.12 |
| 7,628,949 B2 * | 12/2009 | Blackmore | .................. 264/426 |

FOREIGN PATENT DOCUMENTS

| | | |
|---|---|---|
| DE | 24 28 233 | 1/1976 |
| EP | 0 204 672 | 12/1986 |
| EP | 204672 | * 12/1986 |
| GB | 1 454 394 | 11/1976 |
| GB | 1 553 497 | 9/1979 |
| WO | 9715171 | * 4/1997 |
| WO | WO-97/15171 | 4/1997 |

* cited by examiner

*Primary Examiner* — Shawntina Fuqua
(74) *Attorney, Agent, or Firm* — Pandiscio & Pandiscio (57) ABSTRACT

The invention relates to an electrical panel heating device and to a method and a material for the production thereof; the panel heating device is produced by curing a liquid or pasty material, comprising at least one inorganic binding agent, for example cement and/or gypsum, at least one electrically non-conductive additive, for example sand and/or rock flour, and at least one further additive composed of electrically conductive particles, for example carbon fibers and/or trips; after mixing this material in the liquid or pasty state, it is processed to form a product in the form of a panel which is provided with low-impedance contacts for feeding in a current distributed over an panel.

16 Claims, 7 Drawing Sheets

ELECTRICAL PANEL HEATING DEVICE AND METHOD AND BUILDING MATERIALS FOR THE PROTECTION THEREOF

BACKGROUND OF THE INVENTION

1. Field of the Invention

This invention is directed to an electrical panel heating device and to a method and a building material for the production thereof.

2. Description of the Prior Art

In many buildings, particularly old structures with high-ceilinged rooms, it is often difficult to heat a room to a comfortable temperature, since, especially in southern climes, either there is no heating system at all, or the one that is present is not adequate for cold winter days.

Known heating systems usually are high-priced, are complicated to install and sometimes entail structural modifications. Known panel heating devices are designed, for example, to be disposed under the plaster of a wall and are unsuitable for retrofitting in a finished building.

In addition, many electrical heating devices contain water- or vapor-impermeable films or layers, between which the heating device per se is located. Such heaters prevent the necessary diffusion of water vapor through walls and other structural elements. At times when such heaters are not being operated, e.g. in the summer, damp spots occur. Mold (*Aspergillus fumigatus*) then forms on such damp walls, ceilings and floors.

From these disadvantages of the described prior art comes the problem initiating the invention, that of creating an electrical panel heating device that is easy and inexpensive to make and install and is, in particular, suitable for being retrofitted into a finished building.

SUMMARY OF THE INVENTION

This problem is solved, in the context of a method for producing an electrical panel heating device, by mixing a building material that can be worked in the liquid or pasty state from at least one inorganic binding agent, for example cement and/or gypsum, at least one electrically non-conductive additive, for example sand and/or rock flour, and at least one other additive composed of electrically conductive particles, for example carbon fibers and/or carbon chips, and by working the building material to yield a laminar product that is provided with low-resistance contacts for injecting a laminarly distributed current.

Because the electrically conductive particles are distributed in the building material as uniformly as possible by having been blended as completely as possible with the other ingredients, the heating device has a substantially constant sheet electrical resistance and is therefore suitable for a sheet current that is uniform across the sheet. This results in a heat output that is distributed uniformly over the area concerned. There are no "cold" or "hot" spots, but instead an approximately uniformly heated surface covering. Another measure for obtaining a uniformly heated surface covering is to apply the "heating mortar" according to the invention, that is, the building material according to the invention, to the substrate in the most uniform thickness possible. This can be done particularly well with a notched trowel or similar working tool. A planar substrate is ideal, since it is conductive to an even thickness for the layer of heating mortar. The low-resistance contacts have a lower electrical resistance than the heating mortar itself, and therefore distribute the supplied current to the area between two such contacts.

A building material according to the invention that is suitable for producing an electrical panel heating device is distinguished by at least one inorganic binding agent, for example cement and/or gypsum, at least one electrically non-conductive additive, for example sand and/or rock flour, and at least one other additive composed of electrically conductive particles, for example carbon fibers and/or carbon chips.

Since the electrically conductive particles are, at least in part, separated from one another by the matrix, a good choice has proven to be a matrix composed essentially of substances that are generally porous and are therefore more moisture-absorbing than synthetic materials. This, on the whole, lends a much better electrical conductivity to such inorganic or mineral building materials. Cement stone or concrete generally has an electrical resistance $\rho$ of approximately between $0.5 \cdot 10^3$ $\Omega$-cm and $5.0 \cdot 10^3$ $\Omega$-cm, as long as it is not oven-dried. By contrast, synthetic materials, i.e., polymers, are normally classed as insulators, with an electrical conductivity of more than $10^{12}$ $\Omega$-cm. For this reason, an inorganic binding agent is generally preferable over an organic binding agent. Organic binding agents should therefore be used secondarily, if at all, in the context of the invention, that is, as a supplement to an inorganic main binding agent.

It is also possible, in principle, to add fly ash, blast furnace slag and/or silica dust, i.e., silica dust or microsilica, to the building material. However, these admixtures have been found to cause a more or less marked increase in the electrical resistivity of an inorganic binder matrix, so they should be avoided insofar as possible, i.e., the proportions of such ingredients, preferably even the cumulative proportion of all of them, should preferably be less than 1 vol. %.

The previously described building material can be refined in that it is mixed, from a building-material mix containing at least one inorganic binding agent, for example cement and/or gypsum, at least one electrically non-conductive additive, for example sand and/or rock flour, and at least one other additive composed of electrically conductive particles, for example carbon fibers and/or carbon chips, by adding water to a building material that can be worked in the liquid or pasty state to yield a laminar product and then cures to form the finished electrical heating panel.

Mineral building materials are generally hydraulic, that is, they set as they absorb water. Such materials must first be mixed with water for this to occur. In the case of non-hydraulic building materials, setting occurs by evaporation of the added water.

The electrical panel heating device according to the invention is produced according to the method described at the beginning hereof and/or with the use of the previously described building material, by way of the curing of a building material mixed to a liquid or pasty consistency and containing at least one inorganic binding agent, for example cement and/or gypsum, plus at least one electrically non-conducting additive, for example sand and/or rock flour, and at least one other additive composed of electrically conductive particles, for example carbon fibers and/or carbon chips, preferably in a flat, non-load-bearing form, for example with a thickness of 10 mm or less, preferably with a thickness of 8 mm or less, particularly with a thickness of 6 mm or less.

A building material according to the invention can be used as wall mortar, masonry block adhesive, plaster mortar, reinforcing mortar, floor fill mortar, floor fill concrete, concrete, fine concrete, flowable concrete, laying mortar, anchor mortar, filling mortar. It is further suited for use as a coating compound applicable by spreading, a filler compound, coating compounds suitable for any method of application, high-grade plaster, silicate plaster. Other examples of applications include injectable pastes and injectable mortars and adhesives for tile, artificial stone and natural stone; it is even suitable for clay plasters and/or adobe.

In general, the heating device according to the invention is installed at a boundary surface of a room, for example at one or more walls, the floor or the ceiling. The release of heat into the particular room takes place through the surface facing the room. A large layer thickness is not necessary for this type of heat transmission.

The aim of creating the most uniform possible sheet-shaped current is served by a refinement of the invention according to which an electrical panel heating device that is brought to final form by the curing of an initially liquid or pasty building material is further provided with contacts for injecting a sheet current. Generally, the flow of current is in the direction of this sheet; however, it would also be conceivable in the context of the invention to provide a current flow that runs obliquely or even perpendicularly to the particular sheet. The direction of current flow is dictated here by the arrangement of the contacts. For current flow within the sheet, both contacts must also be disposed within the sheet concerned; for current flow approximately perpendicular thereto, the two contacts must be offset from each other approximately perpendicularly to the sheet concerned. Alternatively, however, the contact strips can taper or flare continuously instead of extending parallel to each other. A stronger or less strong current flow is developed as a function of this choice, with the result that higher or lower heat production per unit area occurs at the locations concerned.

In the finished heating device, the conductive particles are expediently embedded in a matrix comprising an inorganic binding agent, particularly in a mineral matrix, for example of cement or gypsum. However, organic substances, for example a polymer, e.g. synthetic resin, can also be added as additional binder constituents.

The building material according to the invention preferably contains inert additives, for example sand or rock flour. The primary purpose of such additives is to reduce the proportion of binder matrix, thus eliminating excessive costs.

In addition, the building material according to the invention can also be admixed with functional additives, for example cellulose, fibers, etc. In contrast to the inert additives cited above, additives of this kind are intended to perform certain functions, for example to increase strength, as in the case of fiber reinforcement; to lower thermal conductivity, for example by means of air entraining agents or lightweight additives; to reduce mechanical vibration, for example, with the aid of heavyweight additives; and furthermore to improve density and/or watertightness, strength, workability and/or workability time, etc.

The conductive particles advantageously contain carbon in one of its technical modifications, particularly in the form of graphite, carbon fibers, carbon chips, glassy carbon, graphene, activated carbon, carbon black, fullerenes, fullerite, carbon nanotubes, carbon nanobuds (covalently bonded molecules of carbon nanotubes and fullerenes) or carbon foam. Amorphous carbon may also be contemplated in principle, although its electrical resistivity is higher than, for example, that of the graphite modification, which is approximately $0.5 \sim 10^{-3}$ $\Omega$-cm. Carbon fibers, by contrast, have a somewhat higher electrical resistivity, on the order of about $5.0 \cdot 10^{-3}$ $\Omega$-cm. Fullerenes, which occur in the form of fullerite or in conjunction with carbon nanotubes, also have a very low resistivity.

The electrically conductive particles mixed into the inventive building material and then embedded in the matrix of the mortar layer or in a coating are advantageously carbon powder, carbon fibers, carbon grains, carbon chips, or embedded graphite leads or rods, or silicon particles, particularly doped silicon, but also other semiconductors.

A particularly advantageous choice has proven to be, for example, carbon black, coke or a polymer filled therewith, such as paper, which is then incorporated into a mortar matrix as electrically conductive paper shreds providing electrical resistance. A mortar of this kind can be used to produce a gypsum paper fiber heating panel, or it can incorporated into or applied to the gypsum core of a gypsum cardboard panel. It would also be conceivable to use other materials, however, as long as it is ensured that the mortar layer has a substantially constant sheet electrical resistance that is suitable as a heating resistance. For instance, it may be contemplated to use a multiplicity of graphite leads or graphite rods with suitable electrical contacts. It is also conceivable to use electrically conductive polymers, polythiophenes, polyacetylenes or, alternatively, powdered metals such as gold, silver, zinc. These precious metals can, for example, be applied to blown perlites, foam glass or glass microspheres.

Another alternative is to use other conductors or semiconductors with a lower electrical resistivity than the matrix of the building material concerned, preferably as a cement matrix or a similar inorganic binder matrix, thus in particular an electrical resistivity of less than $0.5 \cdot 10^3$ $\Omega$-cm, i.e., for example, conductive particles composed of silicon, particularly doped silicon.

The conductive particles used can be in many different forms. In general, however, preference should be given to an elongated or stretched-out geometry, i.e. chips or fibers, since these offer a larger surface area than, say, spherical particles of the same volume. The probability that such particles will meet and make electrical contact is therefore much higher than it is with spherical particles, for example.

Use of the above-cited materials has proven especially advantageous for the production of a panel heating device according to the invention. It would also be conceivable to use other materials, however, as long as it is ensured that the heating device has a substantially constant sheet electrical resistance that is suitable as a heating resistance. For instance, the use of a multiplicity of graphite leads or graphite rods with suitable electrical contacts is also conceivable.

The conductive substances can optionally be added in pure form or in the state of being applied to a backing material, for example in the form of paper or the like, printed or saturated or otherwise blended with the conductive substance.

The candidates for use as inorganic binding agents for the mortar heating layer are basically cement and cement-like materials, such as, for example, microcements and refractory cements, but also gypsum, anhydrite, hydraulic and high-hydraulic limes, magnesite, clay and loam, as well as silicates, potash water glass and all other possible blends of such substances.

Additional organic binders, such as, for example, silicone resin and acrylic resin—particularly dispersions—may also be considered, particularly for coatings, particularly for spreadable compounds and finishing-filler pastes.

Particularly suitable for use as inert additives for the mortar heating layer are sands, gravel, crushed gravels, marble sands, plaster stone, anhydrite stone, scoria or pumice.

Recommended for use as workability-enhancing functional additives for the mortar compounds and coating compounds for the heating layer are, for example, setting retarders, such as, for example, fruit acids, but also setting accelerators, dispersions, ureas, silicone resins, acrylic resins, latex, cellulose, air entraining agents, adhesive and bonding materials and plasticizers, as well as thickeners.

As lightweight additives, perlites, pumice, expanded clay, polystyrene, foam glass, glass microspheres are preferably incorporated.

In choosing the blend for the mortar materials or coating materials to be used in producing the heating layers, it is advantageous to select binding agents, inert additives, functional additives and lightweight additives such that quick drying is achieved, e.g., a blend of aluminate cement and gypsum material, or that thermal recuring takes place, e.g. by the readily feasible addition of polyurethane resins. In choosing the type and quantity of the electrically conductive material providing thermal resistance, care must be taken to ensure that, on the one hand, adequate heat output is obtained, and on the other, that there is no overheating of the heating layer. In addition to the inorganic binders, a polyurethane resin solidifying at, for example, 60° C. can be mixed into the mortar heating layer, as described above. The heating layer is brought to this temperature once and is then taken back to the intended operating temperature, e.g. 30° C.

The mortar heating layer usefully has a thickness of 0.02 mm (as a paint or coating) to 15 mm (e.g. plaster, gypsum cardboard panels).

In choosing the heating resistance of the heating device, it must be kept in mind that, on the one hand, adequate heat output must be obtained, and on the other, overheating of the heating device must be avoided. Advantageously, the heating device has a sheet electrical resistance R of 3Ω to 9Ω when the inventive building material is in the cured state. A sheet resistance for the heating device of 5Ω to 7Ω, particularly of approximately 6Ω, is particularly advantageous. The sheet resistivity R of a resistance layer of thickness d with an isotropic electrical resistivity $\rho$ is R=$\rho$/d. Thus, assuming a thickness d of 0.5 cm, a sheet electrical resistance for example of R=6Ω requires an electrical resistivity $\rho$ for the cured building material of approximately 3.0 Ω-cm. This value is about one-hundredth the resistivity of an inorganic binder matrix, but approximately a thousand times the resistivity of a carbonaceous material. Therefore, the fraction by volume $V_c$ of conductive particles in the cured building material—and thus also in the dry mix of the building material before mixing—is chosen to be much smaller than that of the other ingredients taken together: that is, referred to the total volume of cured building material: $V_c \leq 50$ vol. %, for example $V_c \leq 30$ vol. %, preferably $V_c \leq 20$ vol. %, particularly $V_c \leq 15$ vol. %. On the other hand, the invention recommends that the fraction $V_c$ of conductive particles in the cured building material—and thus also in the dry mix of said material before mixing—be chosen to be greater than 1 vol. %, for example greater than 2 vol. %, preferably greater than 5 vol. %, particularly greater than 10 vol. %.

In the case of a square layer with electrodes over the entire length of two opposite edges, the resistance R=U/I is the same as the sheet resistance R, the edge length of the square being arbitrary. Assuming a distance between contacts of 100 cm and a thickness d of 0.5 cm, and thus, consequently, a sheet resistance R of 6Ω, the result, given an applied voltage of 24 V, is a current flow I along a contact edge length of 100 cm of I=U/R=24 V/6 Ω=4 A. The maximum output P per m² thus becomes P=U·I=24 V·4 A≈100 W.

Assuming a heating area that is approximately ceiling-high and about 5 m wide, this yields, for example, a heating area A of 2.0 m·5.0 m=10.0 m². Such a heating device according to the invention, with a total area of 10 m², for example, thus supplies a maximum heat output P of 1 kW. A heat output P on this order should generally be completely adequate for heating a room.

The invention therefore recommends that the inventive building material, in the set, dried state, have an electrical resistivity $\rho$ of at least $10^{-3}$ Ω-cm, preferably an electrical resistivity $\rho$ of at least $10^{-2}$ Ω-cm, particularly an electrical resistivity $\rho$ of $10^{-1}$ Ω-cm or more, or even an electrical resistivity $\rho$ of 1 Ω-cm or more, and/or an electrical resistivity $\rho$ of no more than $10^4$ Ω-cm, for example an electrical resistivity $\rho$ of at most $10^3$ Ω-cm, particularly an electrical resistivity $\rho$ of $10^2$ Ω-cm or less, or even an electrical resistivity $\rho$ of 10 Ω-cm or less.

The heating device usefully has at least two low-resistance strips as terminal electrodes for the electrical connections; these are preferably disposed along two mutually opposite ends or edges of the heating device so as to obtain the most uniform possible current flow over the area of the heating device. For this purpose, the electrical conductivity of the electrically conductive connectors should be at least ten times that of the cured building material itself, for example an electrical conductivity that is at least twenty times that of the cured building material itself, preferably an electrical conductivity that is at least fifty times that of the cured building material itself, particularly an electrical conductivity that is at least one hundred times that of the cured building material itself. Copper, for example, has an electrical resistivity $\rho$ of $\rho$=1.78·$10^{-8}$ Ω-cm and an electrical conductivity of approximately 0.57·$10^8$ (Ω-cm)$^{-1}$; this conductivity is actually more than one thousand times the electrical conductivity of the cured building material, preferably more than ten thousand times greater, particularly more than one hundred thousand times greater, indeed more than one million times greater than said value. In such cases, the electrical resistance in the vicinity of the contacts can be confidently disregarded, and all power is converted into heat in the cured building material.

The terminal electrodes are advantageously, for example, printed or vapor-deposited metal strips. The low-resistance strips usefully contain a metal or a metal alloy. Copper strips are particularly advantageous as terminal electrodes, since copper has a very high electrical conductivity. But electrical connections or terminal electrodes of another material may also be contemplated, provided that the material in question has a high electrical conductivity and is suitable for contacting an electrically conductive material of the inventive heating device, for example has a low contact resistance.

The terminal electrodes or contacts can, for example, be comprised solely of metal strips, but they can also be applied to a carrier material, for example paper or film.

The heating device is advantageously arranged to be connected for operation to a low voltage of up to 60 V. A low voltage of around 12 V to 48 V is particularly preferable. If, for example, the heating device is to be connected to a mains voltage, e.g., to a 230 V a.c. voltage, then it is useful to interpose an (isolating) transformer that galvanically isolates the heating device from the supplying network. Due to the use of a low voltage, even direct contact with the heating device connected to a low-voltage source is non-hazardous.

The heating device can advantageously be connected to a photovoltaic system, which will usually supply suitable low voltages.

If the heating device is embodied as a cured, rigid panel, then it can be mounted on a wall or ceiling of a building with the aid of suitable mounting means, preferably in such a way that there is a gap between the heating device and the wall or ceiling.

Under these circumstances, a distance of approximately 1.0 mm to 20 mm between the heating device and the wall or ceiling is advantageous. Particularly preferred is a distance of 2.0 mm to 10 mm, particularly 3.0 mm to 8.0 mm, between the heating device and the wall or ceiling. Distances of more than 20 mm are also conceivable, of course. But it should be kept in mind that the space between the heating device and the wall or ceiling normally represents lost useful area, so overly large distances should generally be avoided.

The gap between the heating device and the wall or ceiling is usefully at least partially filled with air, which isolates the heating device both thermally and electrically from the wall or ceiling.

Particularly with damp walls or ceilings, electrical isolation of the heating device with respect to the wall or ceiling is useful to ensure trouble-free operation of the heating device.

To this end, the heating device can further comprise an electrically insulating coating or layer disposed between the heating device and the wall or ceiling.

In another preferred embodiment of the invention, one side of the panel is at least partially structured, having in particular a corrugated profile, a serrated profile or a swallowtail profile. Such a structured side of the panel can be mounted directly at the wall or ceiling, with air-filled cavities remaining between the contact points of the wall or ceiling and the panel; these cavities thermally insulate the heating device from the wall or ceiling.

The panel of the heating device advantageously contains one or more of the following materials: gypsum plaster, gypsum fiber, chipboard, cement- or magnesite-bound wood fiber, wood, insulation, synthetic material or synthetics-bound materials, ceramic.

In another preferred embodiment of the invention, the panel of the heating device has a core that comprises electrically conductive particles, for example the panel is a gypsum cardboard panel whose gypsum core comprises electrically conductive particles that are added to the gypsum mortar during the production process, or said panel is a gypsum fiberboard panel comprising electrically conductive particles both in the gypsum material and in the paper fibers.

The additional, rigid panel advantageously contains one of the following materials: gypsum cardboard, gypsum fiber, chipboard, synthetics-bound materials.

In the case of such, or other, panels, a thermal mortar according to the invention can also be used to bond two panels together. This also applies to, for example, panels made of foam glass, polystyrene, etc. The thickness of such a panel can be as much as 3 cm or even more.

In a further, particularly preferred exemplary embodiment, the heating device is embodied to be disposed on a floor of a building, under a floor covering.

BRIEF DESCRIPTION OF THE DRAWINGS

Other features, characteristics, advantages and effects based on the invention will emerge from the following description of preferred exemplary embodiments of the invention and from the drawings, wherein.

DESCRIPTION OF THE PREFERRED EMBODIMENTS

Figure 1:
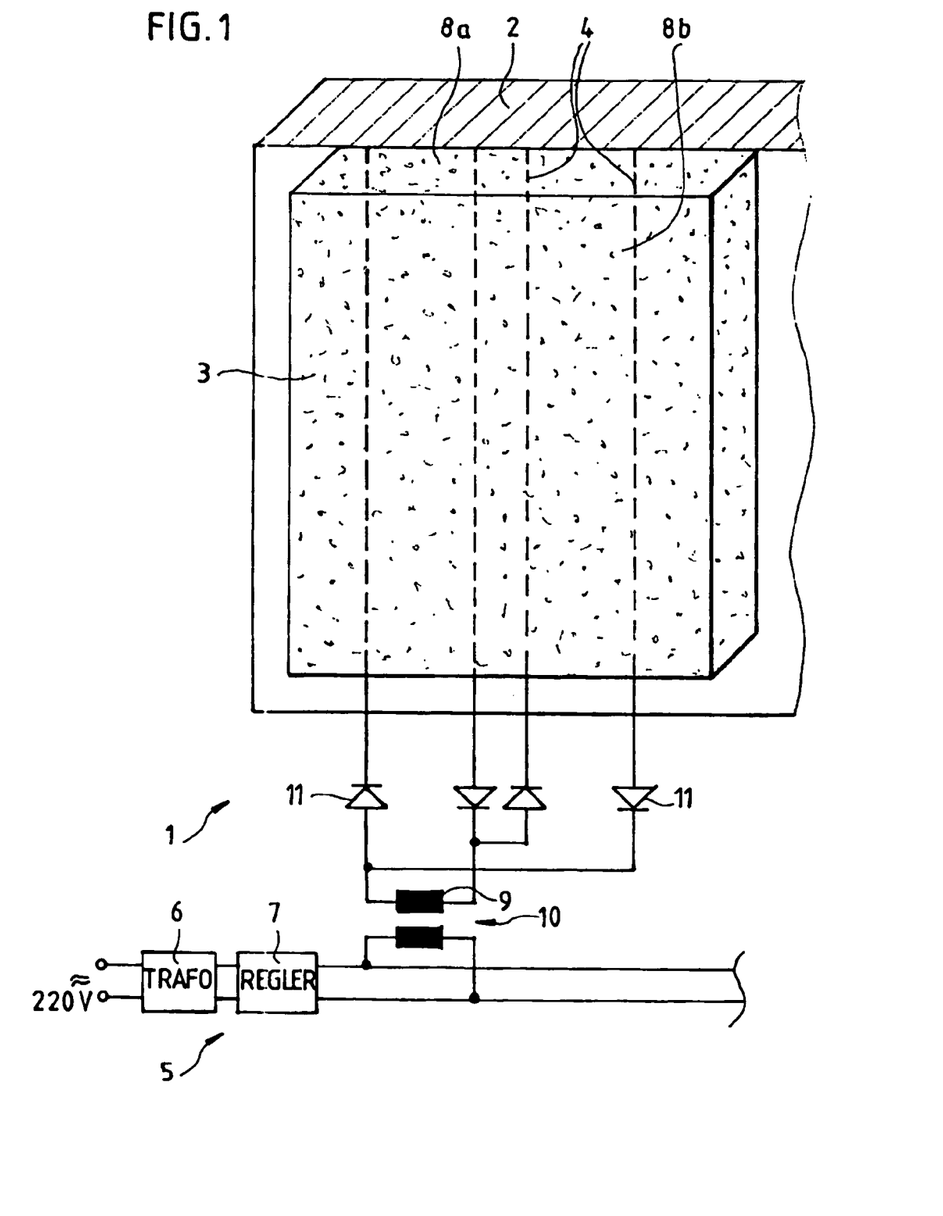
FIG. 1 is a schematic depiction of a part of a heating device in accordance with a preferred embodiment of the invention.

FIG. 1 is a schematically and greatly simplified drawing of one embodiment of a heating device 1 according to the invention. Disposed on and/or at a solid, load-bearing-capable substrate 2 is a heating layer 3 composed of a cured building material according to the invention. The heating layer 3 preferably has a smaller thickness d than the load-bearing-capable substrate 2, for example a thickness d of between 1 mm and 10 mm, and, by virtue of conductive particles mixed into an inorganic binder matrix, its electrical resistivity $\rho$ is lower than the specific electrical conductivity $\rho$ of the substrate material 2, for example at least twice as high, preferably at least twenty times higher, particularly at least two hundred times higher.

Extending at or in the conductive heating layer 3 are two or more electrically conductive contacts 4. These contacts 4 can, for example, be constituted by copper tracks or copper wires, which preferably run parallel to one another, particularly in a vertical direction. To ensure sufficient functional reliability, these metal strips 4 should have a width of at least 5 mm, preferably a width of at least 10 mm, particularly a width of at least 15 mm. It is important, in this, to achieve the best possible contact with the current-carrying layer 3 of the heating device 1.

Two mutually adjacent contact tracks or contact wires 4 are coupled to an electrical power supply, particularly to an electrical voltage source 5. This is preferably fed by an a.c. mains power network, for example delivering 220 or 230 V.

The contacts 4 are connected across a transformer 6, particularly an isolating transformer, to a voltage source, in this exemplary embodiment having a mains voltage of 220 V. The (isolating) transformer 6 converts the mains voltage of 220 V or 230 V to a low voltage of, for example, 60 V or less. Such a low voltage ensures that even direct contact with the heating device is completely non-hazardous. It is advantageous to operate the inventive panel heating device at a low voltage of 12 V to 60 V. Either alternating current or direct current can be used.

Alternatively, the low voltage could be supplied directly from a low-voltage source, for example a photovoltaic system.

To control and/or regulate the heating device, the transformer 6 can be provided, upstream or downstream, with a regulator 7 with which the heat output can be controlled or regulated. If alternating current is being supplied, for example a phase angle control can be used, for example employing one or more TRIACs or thyristors. The trigger angle can be adjusted to vary the electrical power delivered to the heating layer 3. This power can either be controlled by reference to a nominal value settable on a potentiometer or the like, or it can be regulated, using a temperature sensor to measure the actual value.

Furthermore, different fields 8 of the heating layer 3 can be electrically decoupled from one another to prevent short circuits. This can be done either by supplying the output voltages of the respective transformers 6 or regulators 7 of different fields 8 by means of different galvanically non-interconnected secondary windings 9 of one or more isolating transformers 10, and/or by cutting in diodes 11, so that, for example, adjacent fields 8 are each able to conduct current only during one half-wave of the supply voltage, thus at least eliminating the possibility of a short circuit between adjacent fields 8. As FIG. 1 shows, it may also be contemplated to combine these principles; the advantage is that only one regulator 7 is necessary, despite the decoupled heating fields 8.

Figure 2:
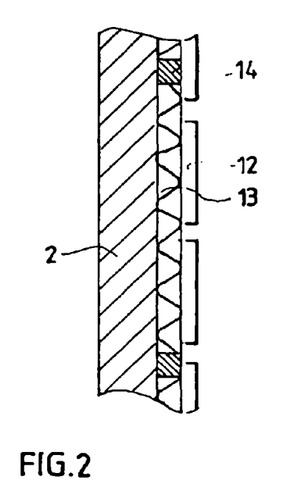
FIG. 2 is a cross-sectional view of a portion of a preferred embodiment of the invention.

FIG. 2 schematically illustrates another exemplary embodiment of the present embodiment in cross section.

The drawing shows a substrate 2 on which a slab covering 12 is installed. The substrate 2 can in this case be a wall, but it can also be a floor. The slabs 12 can be tiles and/or natural stone and/or artificial stone. They are fixed in place by means of a pasty building material in the form of a tile or natural stone or artificial stone adhesive 13, which is preferably applied to the substrate 2 with a comb-like spatula, particularly a notched trowel. The electrically conductive particles according to the invention are preferably mixed into this adhesive 13, and, after curing, the adhesive layer 13 forms the heating layer per se. To activate it, interposed between the slab covering 12 and the substrate 2 are spaced-apart contacts 14 that distribute the supplied current in laminar fashion.

Figure 3:
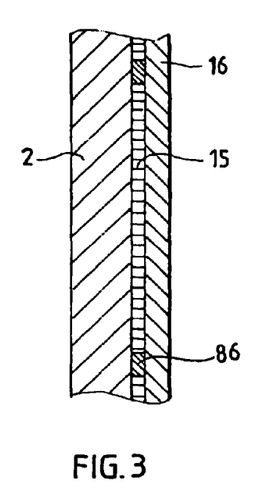
FIG. 3 is a cross-sectional view of another preferred embodiment of the invention.

In the arrangement of FIG. 3, the substrate 2 is a concrete wall. Disposed thereon is a plaster bonding bridge 15, particularly a microcement plaster bonding bridge; this preferably contains, as an inert additive, fine quartz sand, for example with a grain size of 0.2 mm, as well as electrically conductive carbon black particles. This plaster bonding bridge 15 is brushed on or applied with a lambskin roller in sand grain thickness, or it is sprayed onto the very smooth concrete wall substrate 2 with a spray nozzle. For better adhesion, the plaster bonding bridge 15 can be admixed with, for example, an acrylic resin and/or cellulose. Terminal electrodes 86 are embedded in this very thin layer, and are supplied by a power supply with a voltage of, for example, 24 V. The bonding bridge paint 15 contains about 30 g to 60 g of electrically conductive carbon black per square meter.

The whole is covered with a plaster layer 16 of conventional gypsum machine plaster. After drying, the entire plaster coating becomes the mortar heating device. The plaster layer 16 itself is preferably somewhat thicker than the plaster bonding bridge 15; for example, it has a thickness of approximately between 5 and 15 mm.

Figure 4:
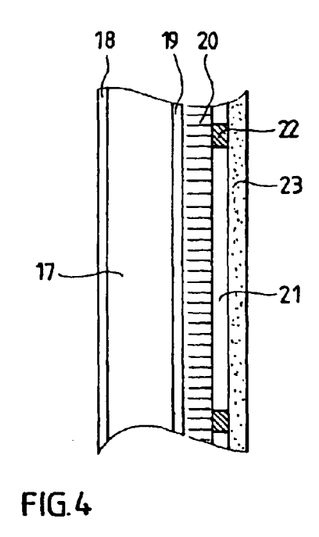
FIG. 4 is a cross-sectional view of a further preferred embodiment of the invention.

In the arrangement according to FIG. 4, the substrate 2 is a wall with a different structure: A hollow-chamber wall 17 can be equipped with phase change materials (PCM), which undergoes [sic] a phase change from the solid to the liquid aggregate state at a desired temperature, for example 20° C., enabling it to absorb or dissipate a comparatively large amount of heat at that temperature without any accompanying temperature variations. This material can be disposed, for example, in the chambers of the hollow-chamber wall. Since the hollow-chamber wall 17 is an exterior wall, it is provided on its outer side with an exterior plaster 18. A honeycomb paper panel 20 is fixed to the interior face with a mortar adhesive 19, and a heating layer 21 per se is applied to the front face of that as a finishing-filler material, e.g. gypsum. Various contact tracks or contact lines 22 are embedded in this heating layer 21, and top coat plaster 23 is then applied on top of that.

Figure 5:
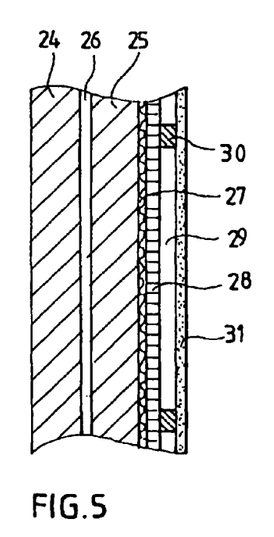
FIG. 5 is a cross-sectional view of a further embodiment of the invention.

FIG. 5 shows another, particularly preferred, example of a heating device according to the invention. Here, the substrate 2 is a concrete sandwich panel of the kind commonly encountered primarily in Eastern countries, comprising two mutually parallel concrete slabs 24, 25 with an insulating layer 26 between them. A mortar heating layer is applied in the vicinity of the interior face of such an exterior wall: For this purpose, first, a cement adhesive 27 is used to mount an insulating layer 28 composed, for example, of 1.5 cm thick polystyrene or polyurethane, or a corrugated cardboard panel, or a foam glass panel, or the like. This is topped by a layer 29 of gypsum- or cement-bound finishing filler with a coat thickness of about 4 mm, with or without non-metallic reinforcing fabric, for example a plaster reinforcing fabric. This reinforcing fabric can also be a glass silk fabric with electrically conductive fibers woven into it. This optionally reinforced finishing-filler layer 29 is mixed with material that is limitedly electrically conductive but provides electrical resistance, e.g. carbon particles or metal powder. To improve workability, glass microspheres are mixed in as a lightweight additive. This optionally reinforced finishing-filler layer 29 is provided with terminal electrodes 30 and contacted with a 12 V low-voltage current. The resulting mortar heating layer 29 can further be coated with a conventional plaster 31, e.g. a cement-bound mineral plaster, or it can be painted with color, for example with a silicone resin based, emulsion based, acrylic resin based or silicate based paint or plaster.

Figure 6:
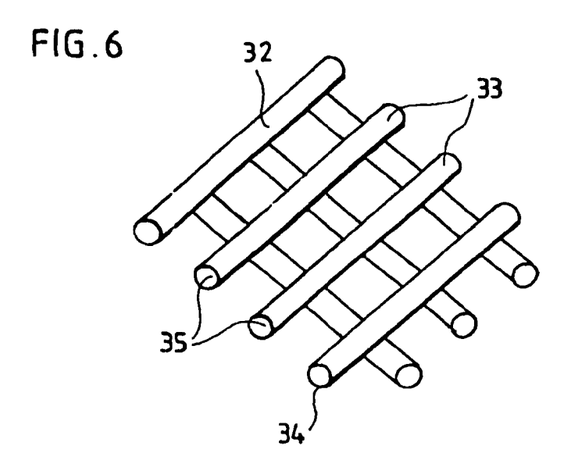
FIG. 6 is a perspective view of a plastic-meshwork for receiving of an injection building material in accordance with the present invention.

In another case, illustrated in FIG. 6, air- and water-tightly sealed cavities 35 are provided in an air- and water-tight plastic tube mesh 32, i.e., a mesh composed of tubes 33 whose sheaths 34 are preferably made of plastic. An injectable building material according to the invention is introduced into the cavities as the heating layer and is electrically contacted. Such a tube heating mesh 32 can be used anywhere a watertight application is called for, e.g. in connection with a swimming pool, particularly a concrete swimming-pool wall.

Figure 7:
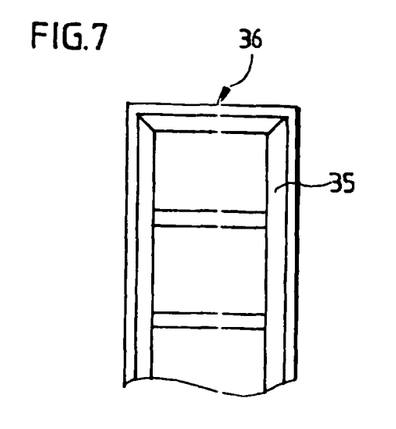
FIG. 7 is an elevational view of a frame and shroud parts with a heating mortar construction material in accordance with the present invention.

According to FIG. 7, the casing and/or frame portions 35 of plastic windows 36 and plastic doors are filled or coated on the inside with the heating mortar building material according to the invention and are electrically contacted to permit their use as heating elements.

Figure 8:
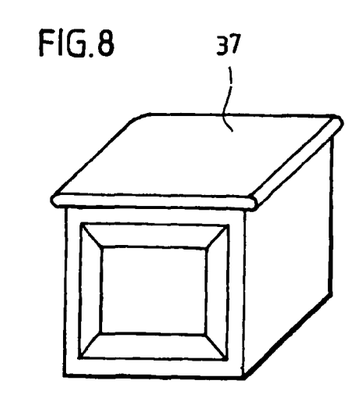
FIG. 8 is a perspective view of a formed component with a heating mortar construction material in accordance with the present invention.

As FIG. 8 shows, other preforms 37, made for example of glass, porcelain or ceramic, can be internally or externally coated or filled with a heating mortar and thus also become heating preforms.

Foam glass parts 38 can be produced in any form, for example as foam glass sections, foam glass panels or foam glass stones. As can be seen from FIG. 9, such foam glass parts 38 can be fabricated with or subsequently provided with recesses 39, particularly with grooves, slots or milled cuts. The heating building material according to the invention can be poured into or applied to these recesses 39 and electrically contacted.

Figure 10:
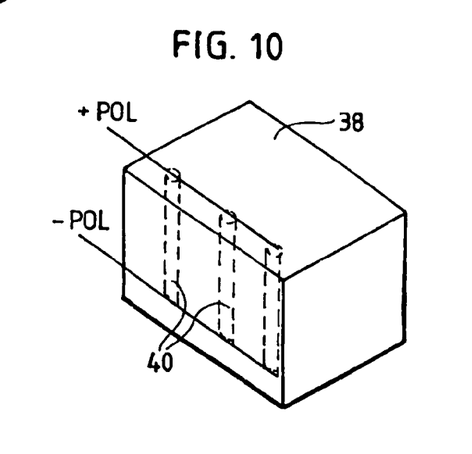
FIG. 10 is a perspective view of another embodiment of a glass foam component with a heating mortar construction material in accordance with the present invention.

Finished foam glass parts 38 can also have internal cavities 40, preferably passing all the way through between two approximately facing surfaces, particularly in the form of channels or bores. The heating building material according to the invention can also be filled into these cavities and electrically contacted therein.

Graphite rods could also be placed in such channels.

Figure 9:
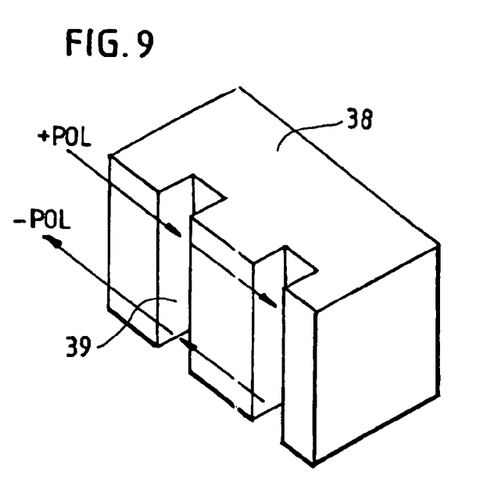
FIG. 9 is a perspective view of a glass foam component with a heating mortar construction material in accordance with the present invention.

As an additional alternative, it would be conceivable during the foam glass production process to add metal powder to the raw material before the molten glass, thus enabling the finished foam glass parts 38 themselves to be used as a heating device; in this case, electrical contacts could then be placed in recesses 39, 40, if present.

Figure 11:
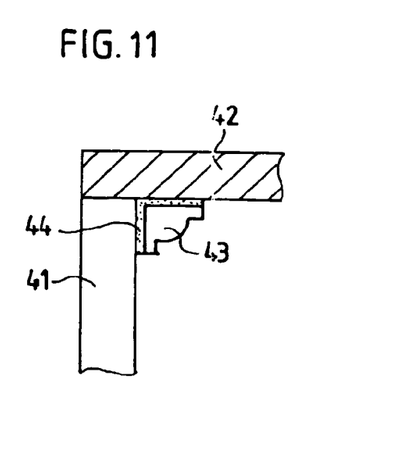
FIG. 11 is a sectional view of a further embodiment of a glass foam component with a heating mortar construction material in accordance with the present invention.
Figure 12:
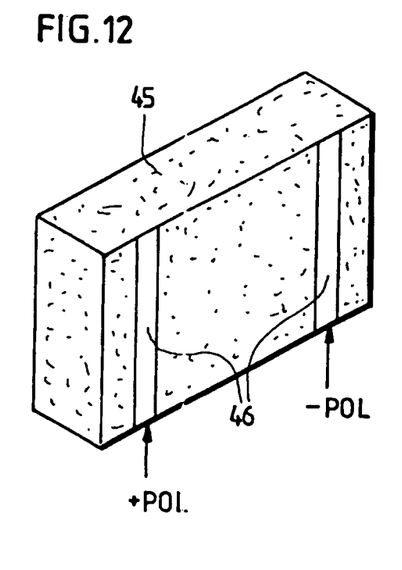
FIG. 12 is a perspective view of a gypsum fiber plate as a heating plate in accordance with the present invention.

Another variant is depicted in FIG. 11. The drawing shows the region of the transition from a room wall 41 to the room ceiling 42. Extending along this ceiling edge is a molding 43, preferably a foam glass section. This is securely bonded to the room wall 41 and/or to the room ceiling 42 with an adhesive 44. According to the present invention, this adhesive 44 can also be provided with intermixed conductive particles and used as a heating building material. A gypsum fiberboard panel 45 represented in FIG. 12 is a structural panel essentially comprised of paper shreds, i.e., organic polymer fibers (paper fibers), as filler, and with gypsum as a binder. Here, conductive particles can be embedded in a matrix of organic material, particularly an organic polymer, e.g. paper. Gypsum fiberboard panels 45 can thus, for example, be made from paper fibers that have first been saturated with graphite or another (semi)conductor, and consequently become heating panels when they are provided with electrical contacts 46, particularly contact tracks 46. In this approach, the paper shreds printed or saturated with a conductive material and embedded in the building material serve as conductive particles in the sense of this invention. On the other hand, the binding agent of such gypsum fiberboard panels 45 can itself consist of a gypsum putty, which is mixed with (other) conductive particles.

Figure 13:
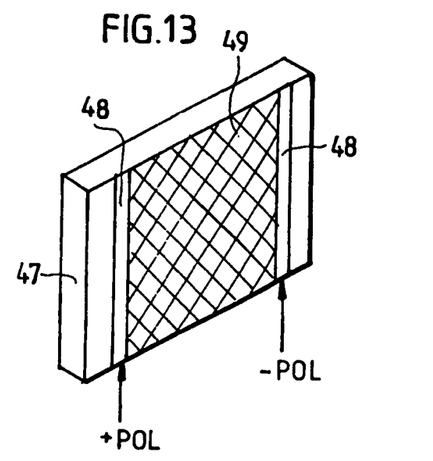
FIG. 13 is a perspective view of a gypsum fiber plate with applied heating layer in accordance with the present invention.

This applies in similar fashion to polymer fiberboard panels comprising other binding agents. FIG. 13 shows a microcement polymer fiberboard 47, which can also be fabricated with conductively printed or saturated paper shreds and provided with contacts 48. The same applies to other preforms made from these materials, particularly from paper fibers or polymer fibers, e.g. heatable floor or wall panels.

As FIG. 13 further shows, a heating layer 49 that extends laminarly between the contacts 48 can also optionally be applied to such panels.

Figure 14:
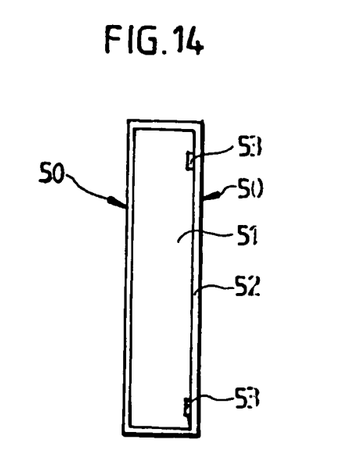
FIG. 14 is an elevational view of a gypsum cardboard plate with a core made of the construction material in accordance with the present invention.

In the embodiment illustrated in FIG. 14, the article is a gypsum cardboard panel 50 produced using a building material according to the invention. This building material, in the cured, state forms a gypsum core 51; this gypsum core 51 is made completely from this building material containing the embedded, electrically conductive, resistance-providing particles, and therefore has an approximately homogeneous electrical conductivity. The gypsum core 51 is wrapped in a cardboard or paper liner 52, the main purpose of which is to keep gypsum particles from detaching as dust from the gypsum core 51. In the context of the present invention, the inner side of this paper liner 52 can be provided with contact tracks 53, for example printed copper lines. If any gypsum cardboard panel 50 of this kind has at least two such contact tracks 53, this makes for at least one complete heating field 8 per panel 50. The power supply can optionally be connected to the contact tracks 53 and the current supplied through electrical leads, or, alternatively, by means of connecting or mounting elements that extend through the leads.

Figure 15:
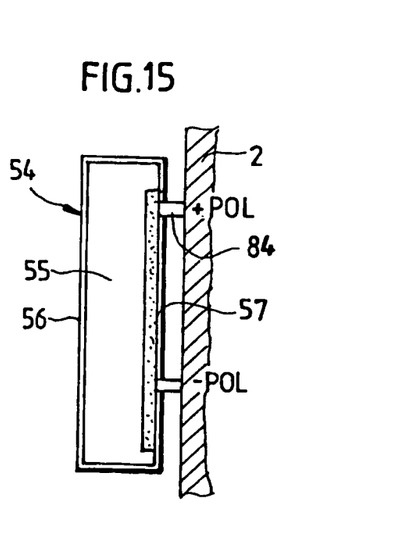
FIG. 15 is a sectional view of a further embodiment of the gypsum cardboard.

A modified embodiment of this principle is illustrated in FIG. 15. Here again, we have a gypsum cardboard panel 54 with a gypsum core 55 and a wrapper in the form of a cardboard or paper liner 56. In this case, however, the gypsum core 55 is made only partially rather than entirely from the inventive building material comprising electrically conductive particles, preferably only in a flat region 57 along a base surface or main surface of the gypsum cardboard panel 54, whereas the rest of the gypsum core 55 is relatively highresistance. In this case, the gypsum cardboard panel 54 can preferably be mounted at a wall or other substrate 2 in such a way that the laminar region 57 consisting of the building material according to the invention faces the substrate 2 concerned. This can be achieved by using a plurality of conductive mounting means 84, for example at least two metal mounting rails, which can be connected to a terminal of a voltage source and will then serve as low-volt electrodes for the panel heating device.

Figure 16:
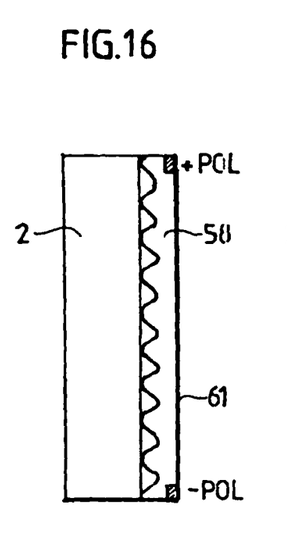
FIG. 16 is a sectional view of a heating panel with a construction material in accordance with the present invention with structured surface.
Figure 17:
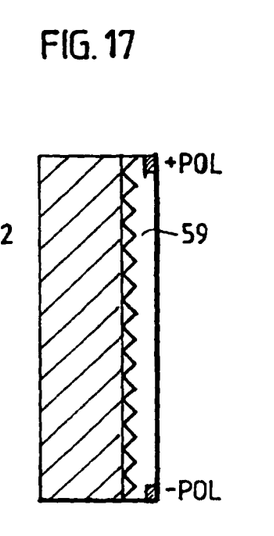
FIG. 17 is a sectional view of another heating panel with a construction material in accordance with the present invention with structured surface.
Figure 18:
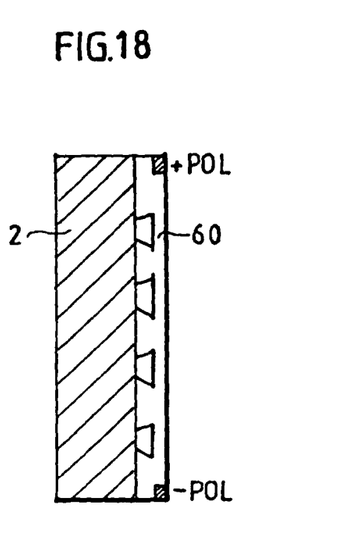
FIG. 18 is a sectional view of a modified heating panel with a construction material in accordance with the present invention with structured surface.

FIGS. 16 to 18 show heating panels 58-60 made with the building material according to the invention, which have a profiled or structured surface so as to achieve a better adhesive bond to the substrate 2 in combination with an adhesive compound or mortar compound 61 applied to said substrate 2. This adhesive compound or mortar compound 61 can contain electrically conductive particles. Heating panel 58 is, for example, corrugated on its back face; heating panel 59 has rear profiling in the form of corrugations with a serrated cross section; this rear profiling can also be swallowtail-shaped, as in the case of heating panel 60 in FIG. 18.

Profiling having a comparable or any arbitrary other cross section could also be provided on the front 61 of the panel to increase the heat emission area.

Figure 19:
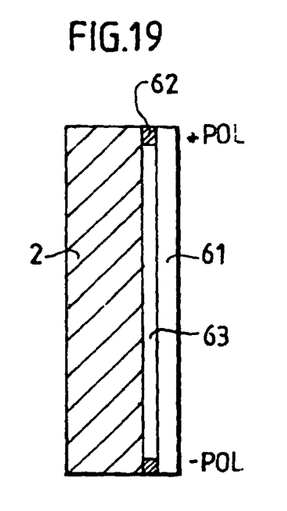
FIG. 19 is a sectional view of a heating panel in accordance with the present invention with structured surface, fixed with distance pieces.
Figure 20:
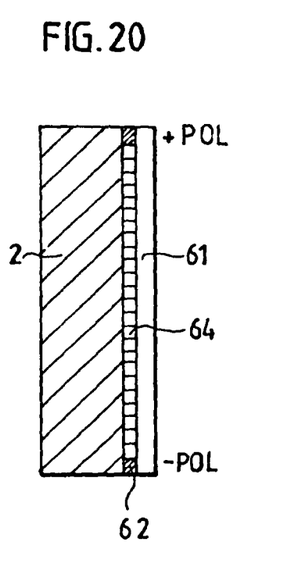
FIG. 20 is a sectional view of a heating panel in accordance with the present invention with integrated excavations.
Figure 21:
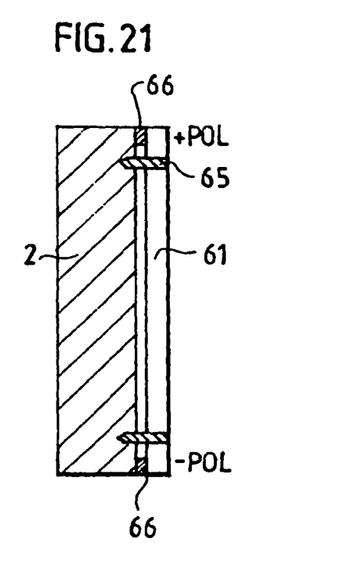
FIG. 21 is a sectional view of a heating panel in accordance with the present invention with structured surface, fixed with distance pieces.

Further advantages can be gained by mounting the inventive heating panels 61 at a substrate 2 but spacedly therefrom, as illustrated in FIGS. 19 to 21. In the embodiment according to FIG. 19, spacers 62, which can simultaneously serve as contact tracks or contact elements, are disposed between the back of the heating panel 61 and the substrate 2. In the regions between these spacers 62 or contact tracks or contact elements there remains, between the heating panel 61 and the substrate 2, a preferably laminar cavity 63 in which air can circulate, if desired, thereby increasing the heat exchange area for the heat that is to be emitted by convection, while at the same time, additional insulation is interposed with respect to an exterior wall as substrate 2. With a cavity 63 of this kind, it is expedient to have a distance between the heating panel 61 and the substrate 2 of 1.0 mm to 20 mm, particularly of 2.0 mm to 10 mm.

The cavities 63 thus created can be used to install insulating material 64, or they can be filled with a phase change material (PCM) by means of which the temperature is kept roughly constant during the particular phase change; see FIG. 20.

It can be seen in FIG. 21 that the mounting means 65, particularly screws, need not necessarily be involved in the contacting. In the example shown, the screws serve instead to hold down contact strips 66, contact rails, or the like, interposed between the heating panel 61 and the substrate 2.

Figure 22:
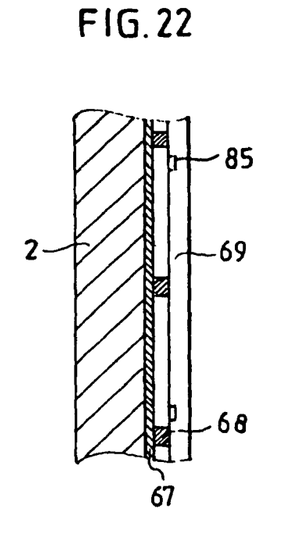
FIG. 22 is a sectional view of a modified embodiment in accordance with the present invention.

FIG. 22 depicts another embodiment of the invention, in which an insulating layer 67 is first applied to a wall or other substrate 2. A heating panel 69 made from a building material according to the invention is then mounted thereon by means of mounting material 68, but preferably is not contacted. Contacting is instead achieved by means of copper lines 85, which are integrated into the heating panel 69, preferably on the back thereof, and are contacted—i.e., can be connected to a current or voltage source—via lead wires.

Figure 23:
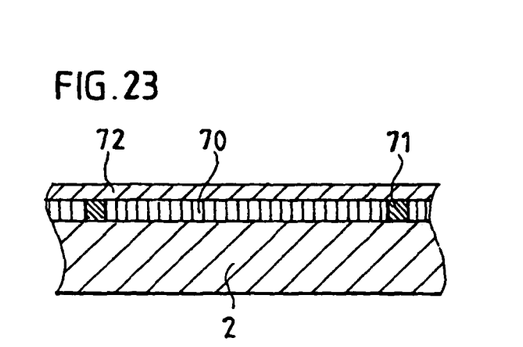
FIG. 23 is a sectional view of a further modified embodiment of the present invention as floor coating in accordance with the present invention.

FIG. 23 shows a particularly advantageous application of the invention, in which, in either new or old buildings, a floor, as the substrate 2, is smoothed by applying in the form of a layer 70 a flowable floor fill mortar containing electrically conductive particles, which in this case—but also in all other cases—can preferably be made from ferrosilicon or chopped carbon fibers, particularly from recycled material from carbon fiber mats. The conductive particles are preferably, in part, extremely small particles. The heating layer has a thickness of up to 50 mm, preferably from 0.02 mm to 5 mm, but also from 0.01 mm to 10 mm or even from 0.001 mm to 15 mm. Contact tracks 71 or similar contact elements can be embedded in the layer 70. Such floor leveling compounds 70 are preferably provided with a covering 72, for example carpeting, or linoleum, laminate, parquet, tiles or natural stone. Such floor finishing-filler or coating compounds can also, however, be implemented without a top covering, including as a colored mortar layer. Such finishing-filler coatings or thin coatings are often coated with clear or colored epoxy resin.

In the context of floor heating, a watertight and simultaneously electrically insulating coating can also be applied to the heating mortar, for example a so-equipped tile adhesive or a bitumen sealant, to which tiles are then glued, for example using a tile adhesive. This type of design is particularly well suited for cubicle bathrooms or the like.

In all the examples described above, the building materials according to the invention can be admixed, not only with graphite particles or metal particles, but also with carbon in the form of so-called carbon nanotubes (CNT), either exclusively or in combination with other conductive particles.

Figure 24:
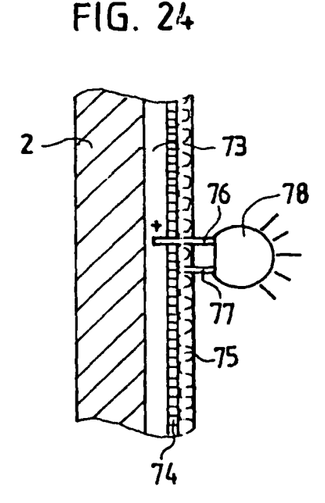
FIG. 24 is a sectional view of a further modified embodiment of the present invention with two panel heating layers and a lamp connected thereon.

A further particularity of the invention is reflected in FIG. 24:

A first laminar heating layer 73 is applied to a substrate 2 by means of a building material according to the invention. This layer is covered with an electrically insulating layer 74. The upper or outer side thereof can have applied to it a second, electrically conductive layer 75 or a second laminar heating layer. Provided in and/or at each electrically (limitedly) conductive layer 73, 75 are contacts (not shown in the drawing), for example contact tracks, which are connected to different terminals of one or more current or voltage source(s). This connection of the current-supplying contacts can be effected in such a way that, at least during the operation of the heating device(s) 73, 75, a voltage offset occurs between the two electrically (limitedly) conductive layers 73, 75. In this way it is possible to connect each of the two connecting leads 76, 77, lead wires or connector pins of a lamp 78—or any arbitrary other two-terminal (low-voltage) electrical load—to a respective one of the two electrically (limitedly) conductive layers 73, 75, for example by pressing them into the building-material mixture while it is still soft. Preferably, one connecting lead 76 in this case is longer than the other connecting lead 77 of the load 78, so that the longer one can pass all the way through the electrical insulating layer 74 but the other cannot. Care should merely be taken to ensure that the connecting lead 77 inserted into the bottom or deeper-lying layer 73 does not come into contact with the top layer 75, to avoid a short circuit between these two layers 73, 75.

Figure 25:
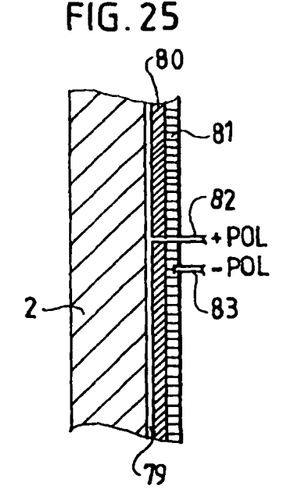
FIG. 25 is a sectional view of another embodiment of the present invention with a metal layer as opposite pole to the actual panel heating device.

FIG. 25 shows an arrangement with a reverse structure. Applied to the substrate 2 is a metal layer 79, which is topped by an electrically insulating, neutral layer 80, which in turn is topped by a layer 81 of the inventive building material mixture as a panel heating device. The metal layer 79 can provide a galvanic connection between an insulating jacket and pins 82, which pass through the outer or top layers 80, 81 and can be used as the first electrical pole to tap the potential in the metal layer 79. The opposite pole can be the laminar heating layer 81 or pins 83 disposed thereat, provided that the latter have a different electrical potential. Electric elements, such as lamps, for example, can then each be connected to a respective such pole pair 82, 83.

Based on their characteristics as recited above, heating devices 1 according to the invention lend themselves to many uses. As long as the material has an attractive visual appearance, the heating device can actually be used as a visible surface, so there is no need to paste conventional wallpaper over it.

The heating device 1 according to the invention can also be used in plumbing applications. For instance, plastic tanks for liquids can be jacketed with the heating device. It is also conceivable to encase a swimming pool in such a heating device 1, for example powered by a photovoltaic system. The heating device 1 according to the invention can be surrounded by a jacket or layer of thermal insulation to minimize heat loss.

The invention claimed is:

1. A method for producing an electrical panel heating device, the method comprising the steps of providing a building material in a liquid or pasty state and comprising a mixture of at least one inorganic binding agent selected from cement and gypsum, at least one electrically non-conductive additive selected from sand and rock flour, and at least one further additive composed of electrically conductive particles selected from ferrosilicon fibers, carbon fibers, and carbon chips, and recycled material from carbon fiber mats, wherein said building material is adapted to yield a laminar product provided with low-resistance contacts for injecting a laminarly distributed current, and wherein the building material is cured in place in the form of a selected one of a floor fill, plaster, mortar and adhesive as a first laminar heating layer provided with first electrical contacts, wherein an outer side of this first laminar heating layer is covered with an electrically insulating layer, and wherein a second laminar heating layer provided with second electrical contacts is applied on the outer side of the electrically insulating layer, which first and second contacts are connected to different terminals of one or more current or voltage source(s) in such a way that during operation of the heating device a voltage offset occurs between the first and second laminar heating layers.

2. An electrical panel heating device made of a building material comprising a mixture of at least one inorganic binding agent selected from cement and gypsum, at least one electrically non-conductive additive selected from sand and rock flour, and at least one further additive composed of electrically conductive particles comprising a selected one of ferrosilicon, carbon fibers, carbon chips, and recycled material from carbon fiber mats, wherein the electrical panel heating device comprises (1) a first laminar heating layer provided with first electrical contacts, (2) an electrically insulating layer covering an outer side of the first laminar heating layer, and (3) a second laminar heating layer provided with second electrical contacts being applied on the outer side of the electrically insulating layer, wherein said first and second contacts are connected to different terminals of one or more current or voltage source(s) in such a way that during operation of the heating device a voltage offset occurs between the first and second laminar heating layers.

3. The electrical panel heating device as in claim 2, wherein the mixture further comprises water, such that the building material is adapted to yield a laminar product.

4. A method for producing an electrical panel heating device in accordance with claim 1 wherein the building material is produced by curing a liquid or pasty building material comprising at least one inorganic binding agent comprising a selected one of cement and gypsum, at least one electrically non-conductive additive comprising sand and/or rock flour, and at least one further additive comprising electrically conductive particles comprising carbon fibers and/or carbon chips and/or recycled material from carbon fiber mats.

5. The method for producing an electrical panel heating device as in claim 4, wherein contacts inject a sheet current.

6. The method for producing an electrical panel heating device as in claim 5, wherein contacts are constituted such that a generally uniform sheet current is produced.

7. The method for producing an electrical panel heating device as in claim 5, wherein the contacts comprise a plurality of metal strips extending generally parallel to one another.

8. The method for producing an electrical panel heating device as in claim 4, wherein the building material, in a set, dried state, exhibits an electrical resistivity $\rho$ of at least $10^3$ $\Omega$-cm, and an electrical resistivity $\rho$ of no more than $10^4$ $\Omega$-cm.

9. The method for producing an electrical panel heating device as in claim 1, wherein a reinforcing fabric is laid in the mortar, and the fabric comprises a glass fiber fabric with electrically conductive fibers woven therein.

10. The electrical panel heating device as in claim 2, wherein said device comprises a panel of a selected one of a cement board panel and a gypsum cardboard panel.

11. The electrical panel heating device as in claim 10, wherein said panel is disposed in front of a selected one of a wall and other substrate.

12. The electrical panel heating device as in claim 11, wherein said panel is disposed at a distance in front of the wall or other substrate, at a distance of 1 mm or more.

13. The electrical panel heating device as in claim 11, wherein said panel is disposed in front of the wall or other substrate, at a distance of 20 mm or less.

14. The electrical panel heating device as in claim 10, wherein said panel is fastened to the wall or other substrate by a selected one of glue, mortar, screws and nails, with the use of a selected one of furring, mounting rails, and spacers.

15. The electrical panel heating device as in claim 10, wherein a gypsum core of the gypsum cardboard panel is provided with electrically conductive particles mixed into gypsum mortar.

16. A method for producing an electrical panel heating device, the method comprising the steps of providing a building material in a liquid or pasty state and comprising a mixture of at least one inorganic binding agent selected from cement and gypsum, at least one electrically non-conductive additive selected from sand and rock flour, at least one further additive composed of electrically conductive particles selected from ferrosilicon fibers, carbon fibers, and carbon chips, and recycled material from carbon fiber mats, wherein said building material is adapted to yield a laminar product provided with low-resistance contacts for injecting a laminarly distributed current, wherein a reinforcing glass fiber fabric with electrically conductive fibers woven into it is laid in the mortar, and wherein the building material is cured in place in the form of a selected one of a floor fill, plaster, mortar and adhesive as a first laminar heating layer provided with first electrical contacts, wherein an outer side of this first laminar heating layer is covered with an electrically insulating layer, and wherein a second laminar heating layer provided with second electrical contacts is applied on the outer side of the electrically insulating layer, which first and second contacts are connected to different terminals of one or more current or voltage source(s) in such a way that during operation of the heating device a voltage offset occurs between the first and second laminar heating layers.

* * * * *